United States Patent [19]

Sarpeshkar et al.

[11] Patent Number: 5,656,713
[45] Date of Patent: Aug. 12, 1997

[54] THERMOFORMABLE POLYURETHANES

[75] Inventors: Ashok M. Sarpeshkar, Upper St. Clair; Peter H. Markusch, McMurray, both of Pa.

[73] Assignee: Bayer Corporation, Pittsburgh, Pa.

[21] Appl. No.: 660,316

[22] Filed: Jun. 7, 1996

Related U.S. Application Data

[63] Continuation-in-part of Ser. No. 818,324, Jan. 9, 1992, abandoned, which is a continuation-in-part of Ser. No. 781,529, Oct. 18, 1991, abandoned.

[51] Int. Cl.$^6$ .................................................. C08G 18/24
[52] U.S. Cl. .............................. 528/58; 528/83; 528/85
[58] Field of Search ................................ 528/58, 83, 85

[56] References Cited

U.S. PATENT DOCUMENTS

| | | | |
|---|---|---|---|
| 4,473,671 | 9/1984 | Green | 523/105 |
| 4,600,653 | 7/1986 | Washila | 428/425.6 |
| 4,784,123 | 11/1988 | Robeson | 128/90 |

OTHER PUBLICATIONS

F.M. Sweeney; Introduction to Reaction Injection Molding; 1979, p. 57.

*Primary Examiner*—Rachel Gorr
*Attorney, Agent, or Firm*—Joseph C. Gil; Richard E. L. Henderson

[57] ABSTRACT

This invention relates to thermoformable polyurethanes prepared by the reaction, at a isocyanate ratio of from 0.8:1 to 1.5:1, of
(a) aliphatic or cycloaliphatic polyisocyanates,
(b) 45 to 95 equivalent percent, relative to component (a), of a polyester, polycarbonate, and/or polyester carbonate diol having a molecular weight of from 2000 to 5000,
(c) 5 to 40 equivalent percent, relative to component (a), of one or more diols having an average molecular weight of from 90 to 530,
(d) optional catalysts, and
(e) optional fillers,
wherein the thermoformable polyurethane is hard, flexible, and opaque at room temperature but softens and becomes formable and, if free of opaque fillers, clear upon heating to a temperature of less than 100° C.

16 Claims, No Drawings

THERMOFORMABLE POLYURETHANES

This application is a continuation-in-part of application Ser. No. 07/818,324, filed Jan. 9, 1992, now abandoned, which is a continuation-in-part of application Ser. No. 07/781,529, filed Oct. 18, 1991, now abandoned.

BACKGROUND OF THE INVENTION

This invention relates to thermoformable polyurethanes prepared by the reaction of aliphatic or cycloaliphatic polyisocyanates with polyester, polycarbonate, and/or polyester carbonate diols having a molecular weight of from 2000 to 5000 and diol chain extenders having an average molecular weight of from 90 to 530. The polyurethanes of the invention are hard and flexible at room temperature but soften and become formable with moderate heating to temperatures below 100° C.

Thermoformable plastics that soften at moderate temperatures but reharden upon cooling can be used as orthopedic splints and casts. For example, U.S. Pat. No. 4,784,123 discloses a thermoplastic polymeric material that can be formed at moderate temperatures comprised of a blend of an aliphatic polyester having a crystalline melting point of 50° to 70° C. and a thermoplastic polyurethane. The patent does not, however, disclose polyurethanes that have the desired properties when used alone.

Polyurethanes that can be thermally deformed at temperatures below 100° C. are known. For example, U.S. Pat. No. 4,473,671 discloses thermoformable compositions prepared by the reaction of certain diisocyanates, isocyanate-reactive polyols or polyamines, and fillers. In particular, the patent describes compositions based on aromatic diisocyanates, polyethers or polyesters, optional chain extenders (although no examples include chain extender), and fillers. The fillers are described as essential for obtaining the desired combination of properties. When aliphatic or cycloaliphatic polyisocyanates are substituted for aromatic polyisocyanates according to the examples, the product is brittle. The addition of a chain extender would normally be expected to increase hardness and brittleness in polyurethanes.

It has now surprisingly been found that the reaction products of aliphatic or cycloaliphatic polyisocyanates, high molecular weight polyester, polycarbonate, and/or polyester carbonate diols having average molecular weights of from 2000 to 5000, and diol chain extenders having average molecular weights of from 90 to 530 are hard, yet flexible at room temperature. When prepared in the absence of chain extenders, polyurethanes based on the same polyisocyanates and polyesters and/or polycarbonates are brittle at ambient temperature, as reflected by their poor elongation properties. The addition of the specified amounts of chain extenders according to the invention results in a significant increase in elongation properties. The resulting polyurethanes are flexible and no longer brittle at ambient temperature.

The polyurethanes of the invention are also opaque at room temperature, even when opaque fillers are absent. Upon moderate heating, polyurethanes according to the invention soften and become formable and, if unfilled, also become optically clear. Upon cooling, these polyurethanes regain their hardness, become unformable, and again become opaque, typically in less than about 15 minutes.

SUMMARY OF THE INVENTION

This invention relates to thermoformable polyurethanes prepared by a process comprising reacting, at a ratio of isocyanate groups to hydroxyl groups of from 0.8:1 to 1.5:1 (preferably 0.95:1 to 1.1:1, more preferably 0.95:1 to 1.05:1), (a) aliphatic or cycloaliphatic polyisocyanates,
(b) about 45 to about 95 equivalent percent (preferably 49 to 81 equivalent percent), relative to component (a), of a polyester, polycarbonate, and/or polyester carbonate diol having a molecular weight of from about 2000 to about 5000,
(c) about 5 to about 40 equivalent percent (preferably 20 to 40 equivalent percent), relative to component (a), of one or more diols having an average molecular weight of from about 90 to about 530,
(d) optionally, a catalyst, and
(e) optionally, fillers, wherein the thermoformable polyurethane is hard, flexible, and opaque at room temperature but softens and becomes formable and, if free of opaque fillers, clear upon heating to a temperature of less than 100° C.

The invention further relates to the process used for preparing sheets or other articles made of such polyurethanes.

DETAILED DESCRIPTION OF THE INVENTION

Suitable aliphatic or cycloaliphatic polyisocyanates for use as component (a) include compounds of two main types. One type includes unmodified aliphatic and cycloaliphatic polyisocyanates. Suitable unmodified aliphatic polyisocyanates have two or more isocyanate groups attached to a linear or branched alkane, preferably a $C_2$–$C_{18}$ alkane. Examples of suitable aliphatic isocyanates include ethylene diisocyanate, 1,4-tetramethylene diisocyanate, 1,6-hexamethylene diisocyanate, and 1,12-dodecane diisocyanate. Suitable unmodified cycloaliphatic isocyanates possess one or more cycloaliphatic rings and have two or more isocyanate groups attached to at least one such cycloaliphatic ring, either directly or indirectly through an aliphatic group. Examples of suitable cycloaliphatic polyisocyanates include 1,3-cyclobutane diisocyanate, 1,3- and 1,4-cyclohexane diisocyanate and mixtures thereof, 1-isocyanato-3,3,5-trimethyl-5-isocyanatomethylcyclohexane ("isophorone diisocyanate"), norbornane diisocyanates, 2,4- and 2,6-hexahydrotoluene diisocyanate and mixtures thereof, and bis(4-isocyanatocyclohexyl)methane or mixtures of the geometric isomers of bis(4-isocyanatocyclohexyl)methane (especially those enriched in the trans,trans isomer). A preferred polyisocyanate is bis(4-isocyanatocyclohexyl)methane.

Other types of suitable polyisocyanates includes those in which two or more isocyanatoaliphatic or isocyanatocycloaliphatic groups are attached to a central heterocyclic ring, such as an isocyanurate ring. Examples of this second type include polyisocyanate trimers known in the art, such as trimerized 1,6-hexane diisocyanate.

In addition to the two types of aliphatic and cycloaliphatic polyisocyanates described above, suitable polyisocyanates include isocyanate-terminated prepolymers and semi-prepolymers prepared from the aliphatic or cycloaliphatic polyisocyanates described above and isocyanate-reactive compounds known in the art (such as polyols), preferably difunctional isocyanate-reactive compounds (such as diols).

Preferred polyisocyanates are those that tend to enhance the crystallinity of the resultant polyurethane.

A discussion of aliphatic or cycloaliphatic polyisocyanates suitable for use as component (a) can be found, for example, in W. Siefken in *Justus Liebigs Annalen der Chemie*, 562, pages 75 to 136.

Suitable high molecular weight diols for use as component (b) include hydroxyl-containing polyesters, polycarbonates, and polyester carbonates conventionally used in polyurethane chemistry. Suitable polyester, polycarbonate, and polyester carbonate diols have average molecular weights in the range of about 2000 to about 5000 (preferably 2000 to 4000, and more preferably from 3000 to 4000). Mixtures of such polyester, polycarbonate, and polyester carbonate diols are, of course, also suitable.

Suitable polyester diols (b) include the reaction products of diols and dibasic carboxylic acids. Instead of free polycarboxylic acids, the corresponding carboxylic acid anhydrides or corresponding carboxylic acid esters of lower alcohols or mixtures thereof may be used for preparing the polyester diols. The carboxylic acids may be aliphatic, cycloaliphatic, aromatic, or heterocyclic and may be substituted, e.g., by halogen atoms, and/or unsaturated. Suitable carboxylic acids include succinic acid, adipic acid, suberic acid, azelaic acid, sebacic acid, phthalic acid, isophthalic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, dimethyl terephthalic, and terephthalic acid bis-glycol esters. Suitable diols include ethylene glycol, 1,2- and 1,3-propanediol, 1,4- and 2,3-butanediol, 1,6-hexanediol, 1,8-octanediol, neopentyl glycol, cyclohexanedimethanol, 1,4-bis(hydroxymethyl) cyclohexane, 2-methyl-1,3-propanediol, diethylene glycol, triethylene glycol, tetraethylene glycol, polyethylene glycols, dipropylene glycol, polypropylene glycols, dibutylene glycol, and polybutylene glycols. Polyesters of lactones, such as ε-caprolactone, or of hydroxycarboxylic acids, such as ω-hydroxycaproic acid, may also be used. Hydrolytically stable polyesters are preferably used in order to obtain the greatest benefit relative to the hydrolytic stability of the final product. Preferred polyesters include polyesters obtained from adipic acid and straight chained or cycloaliphatic diols (preferably 1,6-hexanediol or cyclohexanedimethanol), as well as lactone polyesters, preferably those based on caprolactone and diols.

Suitable polycarbonate diols (b) include those prepared by the reaction of diols, such as 1,3-propanediol, 1,4-butanediol, 1,6-hexanediol, diethylene glycol, triethylene glycol, tetraethylene glycol, or thiodiglycol, with phosgene or diaryl carbonates such as diphenyl carbonate.

Suitable polyester carbonate diols (b) include those prepared by the reaction of polyester diols such as described above, with or without other diols such as 1,3-propanediol, 1,4-butanediol, 1,6-hexanediol, diethylene glycol, triethylene glycol, tetraethylene glycol, or thiodiglycol, with phosgene, cyclic carbonates, or diaryl carbonates such as diphenyl carbonate.

Suitable diol chain extenders for use as component (c) include those conventionally used in polyurethane chemistry, provided that the average molecular weight of the extender or mixture of extenders is between about 90 and about 530 (preferably between 100 and 200 and more preferably between 118 and 200). Examples of suitable diol chain extenders include 1,6-hexanediol and cyclohexanedimethanol. When used alone, lower molecular weight diols, such as 1,4-butanediol, give very hard materials that do not possess the desired thermal softening characteristics. Small amounts of such lower molecular weight diols can be used, however, as long as the average molecular weight remains above 90. Such mixtures are generally less preferred.

The specified quantities of polyol component (b) and diol component (c) are relative to the amount of the polyisocyanate component (a) instead of relative to the total amount of hydroxyl-containing components (b) and (c). Therefore, the total for components (b) and (c) (expressed as equivalent percent) will not necessarily total 100 equivalent percent for all embodiments of the invention. However, the equivalent amount of component (b) (which has a minimum value of 45 equivalent percent relative to component (a)) must always exceed the equivalent amount of component (c) (which has a maximum value of 40 equivalent percent relative to component (a)). That is, the number of reactive hydroxyl groups contributed by diol chain extenders (c) can never equal or exceed the number of reactive hydroxyl groups contributed by polyols (b). Larger relative amounts of chain extender tend to produce undesirably rapid reaction rates and to yield products that do not soften at temperatures below 100° C.

Suitable catalysts (d) include organic metal compounds, especially organic tin compounds. Suitable organic tin compounds include those containing sulfur, such as dioctyl tin mercaptide (German Auslegeschrift 1,769,367 and U.S. Pat. No. 3,645,927), and, preferably, tin(II) salts of carboxylic acids, such as tin(II) acetate, tin(II) octoate, tin(II) ethylhexoate, and tin(II) laurate, as well as tin(IV) compounds, such as dibutyltin dilaurate. Other known catalysts, such as tertiary amine catalysts, can be used but are less preferred. Any of the above-mentioned catalysts may, of course, be used as mixtures.

When used, the optional fillers (e) include those known in the art, such as barium sulfate, calcium sulfate, calcium carbonate, talc, hydrated alumina, clay, kieselguhr, whiteners (such as titanium dioxide), mica, inorganic or organic microspheres, glass flakes, glass fibers, liquid crystal fibers, nylon fibers, polyester fibers, aramid fibers, liquid crystal fibers, carbon fibers, and natural fibers. Suitable fillers tend to enhance the hardness and flex modulus of the polyurethane product without adversely affecting the thermoforming properties. Although fillers tend to mask the optical clarity of polyurethanes of the invention when heated (especially "opaque" fillers, such as titanium dioxide and other whiteners), it is often possible to observe at least some degree of thermally induced clarification when using fillers that do not themselves contribute significant opacity (especially transparent fillers, such as various forms of glass).

When fillers are used, the crystallinity of the polyurethanes can be further enhanced by adding a coupling agent to the filler. Suitable coupling agents are known in the art and include organosilanes, organozirconates, and, preferably, organotitanates. Examples of suitable organotitanates are isopropyl titanate, isopropyl tri(lauryl-myristyl) titanate, isopropyl isostearoyl dimethacryl titanate, isopropyl tri(dodecylbenzenesulfonyl) titanate, isopropyl isostearoyl diacryl titanate, isopropyl tri(diisooctyl phosphato) titanate, isopropyl trimethylacryl titanate, isopropyl tri (dioctyl pyrophosphato) titanate, isopropyl triacroyl titanate, and di(dioctyl phosphato) ethylene titanate.

The thermoformable polyurethanes of the invention can be formed by a one-step or a two-step approach. In the one-step method, the polyisocyanate is allowed to react with a pre-mixed blend of the high molecular weight diol and chain extender, optionally in the presence of a catalyst and a filler. The resultant intermediate bulk material can then be ground up and extruded into sheets or injection-molded or extruded into other articles. In the two-step method, the polyisocyanate, high molecular weight diol, and chain extender, are allowed to react, optionally in the presence of a catalyst, to form a slab of the base resin. The base resin is then ground and coextruded with a suitable filler, using, for example, a twin-screw extruder. The resultant pellets can then be injection-molded or extruded as described above. Extrusion of the compositions according to the invention is particularly facile and can be carried out at moderate temperatures.

Regardless of the method used for their preparation, the polyurethanes of the invention are hard, yet flexible at room temperature, but soften and become formable with moderate heating to temperatures that are typically less than about 100° C. (preferably about 50° to about 100° C., more preferably about 60° to about 80° C.). The polyurethanes are also characterized by high elongation properties as well as high tensile strength. The elongation usually exceeds 200% and often exceeds 500%, and the ultimate tensile strength is greater than 5 N/mm$^2$ (generally at least about 10 N/mm$^2$).

The following examples further illustrate details for the preparation and use of the compositions of this invention. Which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight.

EXAMPLES

Example 1 (Comparison)

A thermoplastic polyurethane was prepared without chain extender according to the following composition:

| Starting material | Weight (g) | Equivalent percent (relative to diisocyanate) |
|---|---|---|
| Bis(4-isocyanatocyclo-hexyl)methane* | 15.0 | — |
| Poly(hexylene adipate)** | 168.70 | 98 |
| Dibutyltin dilaurate*** | 0.184 | — |

*Available as DESMODUR ® W from Bayer Corporation
**Available as FORMREZ ® 66-37 from Witco Chemical Corporation (molecular weight 3000)
***Available as DABCO ® T-12 from Air Products and Chemicals, Inc.

The isocyanate was preheated to 60° C. and added to the molten polyester (75° C.) containing the dibutyltin dilaurate catalyst. The reaction mixture was degassed while stirring for about 50 seconds and poured into a closed mold. The casting was cured for about 16 hours at 75° C., allowed to cool to ambient temperature, and then demolded. Physical properties are listed in TABLE 1 (below).

Example 2 (Thermoformable Product According to the Invention)

A thermoplastic polyurethane was prepared according to the following composition in which about 35 equivalent percent of the hydroxyl groups were present as 1,6-hexanediol:

| Starting material | Weight (g) | Equivalent percent (relative to diisocyanate) |
|---|---|---|
| Bis(4-isocyanatocyclo-hexyl)methane* | 15.0 | — |
| Poly(hexylene adipate)* | 106.78 | 62 |
| 1,6-Hexanediol | 2.36 | 35 |
| Dibutyltin dilaurate | 0.184 | — |

*FORMREZ ® 66-37 from Witco Chemical Corporation (molecular weight 3000)

The polyester, hexanediol extender, and dibutyltin dilaurate catalyst were introduced into a 250-ml glass reactor and maintained at 75° C. The isocyanate was pre-heated to 60° C. and then added in one batch to the rapidly stirring polyester-extender mixture. The reaction mixture was degassed while stirring for about one minute and then poured into a closed mold. After post-curing for about 16 hours at 75° C., the mold was cooled to ambient temperature and the part removed.

The molded product was soft and clear at the post-curing temperature and could be shaped as desired. The material hardened and became opaque upon cooling to ambient temperature.

The physical properties are listed in TABLE 1.

Example 3 (Thermoformable Product According to the Invention)

A thermoplastic polyurethane was prepared by the method of Example 2 (except for using cyclohexanedimethanol instead of 1,6-hexanediol) according to the following composition:

| Starting material | Weight (g) | Equivalent percent (relative to diisocyanate) |
|---|---|---|
| Bis(4-isocyanatocyclo-hexyl)methane* | 15.0 | — |
| Poly(hexylene adipate)* | 109.76 | 64 |
| Cyclohexanedimethanol | 2.89 | 35 |
| Dibutyltin dilaurate | 0.128 | — |

*FORMREZ ® 66-37 from Witco Chemical Corporation (molecular weight 3000)

The molded product was soft and clear at the post-curing temperature (about 70° to 80° C.) and could be shaped as desired. The material hardened and became opaque upon cooling to ambient temperature.

The physical properties are listed in TABLE 1.

TABLE 1

Physical data for Examples 1–3

|  | Example 1 (comparison) | Example 2 | Example 3 |
|---|---|---|---|
| Elongation (%) | 133 | 657 | 617 |
| Elongation set (%) | 120 | 503 | 483 |
| Tensile (N/mm$^2$) | 13.53 | 14.48 | 15.08 |
| Shore D hardness | 51 | 51 | 50 |
| Flex modulus (N/mm$^2$) | 448.3 | 365.5 | 379.3 |

The polyurethanes of the invention exhibited an approximately five-fold increase in elongation properties. In addition, the comparison polyurethane was brittle, whereas the polyurethanes of the invention were not brittle.

Example 4 (Filled Thermoformable Product by a Two-Step Method)

A thermoplastic polyurethane was prepared using the one-shot method followed by co-extrusion with an inorganic filler according to the following composition:

| Starting material | Weight (g) | Equivalent percent (relative to diisocyanate) |
|---|---|---|
| Bis(4-isocyanatocyclo-hexyl)methane* | 252.46 | — |
| Poly(hexylene adipate)* | 2223.49 | 77 |
| 1,6-Hexanediol | 22.80 | 20 |
| Dibutyltin dilaurate | 1.26 | — |

*FORMREZ ® 66-37 from Witco Chemical Corporation (molecular weight 3000)

The polyester, extender, and catalyst were introduced into a one-gallon metal can and allowed to stand for one hour in an oven maintained at 110° C. The isocyanate was preheated to 60° C. and then added in one batch to the rapidly stirring polyester-extender mixture. Stirring was continued for an additional 20 seconds. The reaction mixture was poured into a Teflon-lined pan and cured in an infrared oven for 5 minutes at 120° C. and for another 5 minutes at 90° C. The resultant slab was then cooled to room temperature, chilled in dry ice, and granulated. The granulated material was dried in a vacuum oven at ambient temperature for about 16 hours. The dried granulated material ("base resin") was extruded at temperatures of 90°–120° C. to form pellets. The pellets were then co-extruded with fillers and whiteners on a twin screw extruder at temperatures of 90°–250° C. in the presence of coupling agents such as organotitanates. Physical properties of a product containing 64.4% base resin, 34.7% calcium carbonate, 0.6% titanium dioxide whitener, and 0.3% di(dioctyl phosphato) ethylene titanate (an organotitanate available as KR-212S from Kenrich Petrochemicals) are listed in TABLE 2.

TABLE 2

Physical data of the molded product of Example 4

| Elongation (%) | 780 |
|---|---|
| Elongation set (%) | 600 |
| Tensile (N/mm$^2$) | 9.81 |
| Shore D hardness | 50 |
| Flex modulus (N/mm$^2$) | 351.7 |

Example 5 (Filled Thermoformable Product by a One-Step Method)

A filled polyol component was prepared according to the following composition:

| Starting material | Weight (g) | Equivalent percent (relative to diisocyanate) |
|---|---|---|
| Poly(hexylene adipate)* | 36.51 | 49 |
| Cyclohexanedimethanol | 1.44 | 40 |
| Calcium carbonate** | 26.70 | — |
| Dibutyltin dilaurate | 0.089 | — |

*Available as RUCOFLEX ® S-105-40 from Ruco Polymer Corporation (molecular weight 2500)
**Available as CAMEL WITE from Genstar Stone Products Company A slurry of calcium carbonate, molten polyester, cyclohexanedimethanol chain extender, and dibutyltin dilaurate catalyst was stirred at 75° C. in the amounts specified above to form a thin paste and maintained at that temperature for about 20 minutes. To this paste was added 6.55 g of bis(4-isocyanatocyclohexyl)methane. The reaction mixture was stirred for about 50 seconds and poured into a mold. The casting was cured for 30 minutes at 75° C., allowed to cool to ambient temperature, and then removed from the mold.

The product softened at about 70°–80° C., at which temperature it could be formed into the desired shape. The material hardened upon cooling to ambient temperature.

Example 6 (Filled Thermoformable Product by a One-Step Method)

A filled polyol blend was prepared according to the following composition:

| Starting material | Weight (g) | Equivalent percent (relative to diisocyanate) |  |
|---|---|---|---|
| Poly(hexylene adipate)* | 67.55 | 39 | 81 |
| Poly(1,6-hexanediol carbonate)** | 47.76 | 42 | |
| Cyclohexanedimethanol | 1.65 | 20 | |
| Calcium carbonate | 65.98 | — | |
| Titanium dioxide | 1.32 | — | |
| Dibutyltin dilaurate | 0.13 | — | |

*FORMREZ ® 66-37 from Witco Chemical Corporation (molecular weight 3000)
**Available as DESMOPHEN ® 2020E from Bayer AG, Germany (molecular weight 2000)

A mixture of poly(hexylene adipate) and poly(1,6-hexanediol carbonate), in the amounts specified above, was stirred at 110° C. until homogeneous. Cyclohexanedimethanol chain extender, calcium carbonate, titanium dioxide, and dibutyltin dilaurate catalyst, also in the amounts specified above, were stirred into the molten polyol mixture to form a thin paste that was maintained at 110° C. for about 20 minutes. To the resultant slurry was added 15.0 g of bis(4-isocyanatocyclohexyl)-methane. The reaction mixture was stirred for an additional 50 seconds and poured into a mold. The casting was cured for 30 minutes at 75° C., allowed to cool to ambient temperature, and then removed from the mold. Physical properties of the resultant product are listed in TABLE 3.

TABLE 3

| Physical data of the molded product of Example 6 | |
|---|---|
| Elongation (%) | 513 |
| Elongation set (%) | 358 |
| Tensile (N/mm$^2$) | 6.92 |
| Shore D hardness | 45 |
| Flex modulus (N/mm$^2$) | 286.21 |

What is claimed is:

1. A thermoformable polyurethane prepared by a process comprising reacting, at a ratio of isocyanate groups to hydroxyl groups of from 0.8:1 to 1.5:1, (a) an aliphatic or cycloaliphatic polyisocyanate, (b) 45 to 95 equivalent percent, relative to component (a), of a polyester, polycarbonate, and/or polyester carbonate diol having a molecular weight of from 2000 to 5000, (c) 5 to 40 equivalent percent, relative to component (a), of one or more diols having an average molecular weight of from 90 to 530, (d) optionally, a catalyst, and (e) optionally, a filler, wherein the thermoformable polyurethane is hard, flexible, and opaque at room temperature but softens and becomes formable and, if free of opaque fillers, clear upon heating to a temperature of less than 100° C.

2. A thermoformable polyurethane according to claim 1 wherein the polyisocyanate (a) is bis(4-isocyanatocyclohexyl)methane.

3. A thermoformable polyurethane according to claim 1 wherein component (b) is a polyester diol.

4. A thermoformable polyurethane according to claim 3 wherein the polyester diol is based on adipic acid and 1,6-hexanediol or cyclohexanedimethanol.

5. A thermoformable polyurethane according to claim 3 wherein the polyester diol has a molecular weight of from 2000 to 4000.

6. A thermoformable polyurethane according to claim 3 wherein the polyester diol has a molecular weight of from 3000 to 4000.

7. A thermoformable polyurethane according to claim 1 wherein component (b) is a mixture of a polyester diol and a polycarbonate diol.

8. A thermoformable polyurethane according to claim 7 wherein the polyester diol is based on adipic acid and 1,6-hexanediol and the polycarbonate diol is a polycarbonate based on 1,6-hexanediol.

9. A thermoformable polyurethane according to claim 1 wherein the diol (c) is 1,6-hexanediol, cyclohexanedimethanol, or a mixture thereof.

10. A thermoformable polyurethane according to claim 1 wherein 49 to 81 equivalent percent of component (b) and 20 to 40 equivalent percent of component (c), both relative to component (a), are used.

11. A thermoformable polyurethane according to claim 1 wherein the catalyst is an organic tin compound.

12. A thermoformable polyurethane according to claim 1 wherein the catalyst is dibutyltin dilaurate.

13. A process for preparing a thermoformable polyurethane article comprising (1) reacting (a) an aliphatic or cycloaliphatic polyisocyanate, (b) 45 to 95 equivalent percent, relative to component (a), of a polyester, polycarbonate, and/or polyester carbonate diol having a molecular weight of from 2000 to 5000, (c) 5 to 40 equivalent percent, relative to component (a), of one or more diols having an average molecular weight of from 90 to 530, (d) optionally, a catalyst, and (e) optionally, a filler, wherein the ratio of isocyanate groups to hydroxyl groups is from 0.8:1 to 1.5:1, thereby forming an intermediate bulk product;

(2) grinding said bulk product; and (3) injection molding or extruding the ground bulk product to form a polyurethane article that is hard, flexible, and opaque at room temperature but softens and becomes formable and, if free of opaque fillers, clear upon heating to a temperature of less than 100° C.

14. A process for preparing a thermoformable polyurethane article comprising (1) reacting (a) an aliphatic or cycloaliphatic polyisocyanate, (b) 45 to 95 equivalent percent, relative to component (a), of a polyester, polycarbonate, and/or polyester carbonate diol having a molecular weight of from 2000 to 5000, (c) 5 to 40 equivalent percent, relative to component (a), of one or more diols having an average molecular weight of from 90 to 530, and (d) optionally, a catalyst, wherein the ratio of isocyanate groups to hydroxyl groups is from 0.8:1 to 1.5:1, thereby forming an intermediate bulk product;

(2) grinding said bulk product;

(3) coextruding the ground bulk product and a filler to form pellets; and (4) injection molding or extruding said pellets to form a polyurethane article that is hard, flexible, and opaque at room temperature but softens and becomes formable and, if the filler used in step (3) is not opaque, clear upon heating to a temperature of less than 100° C.

15. An article prepared according to the process of claim 13.

16. An article prepared according to the process of claim 14.

* * * * *